Aug. 5, 1941.　　　　E. M. DONS ET AL　　　　2,251,785
METHOD OF MOLDING ADHESIVE MATERIALS
Filed Feb. 26, 1938
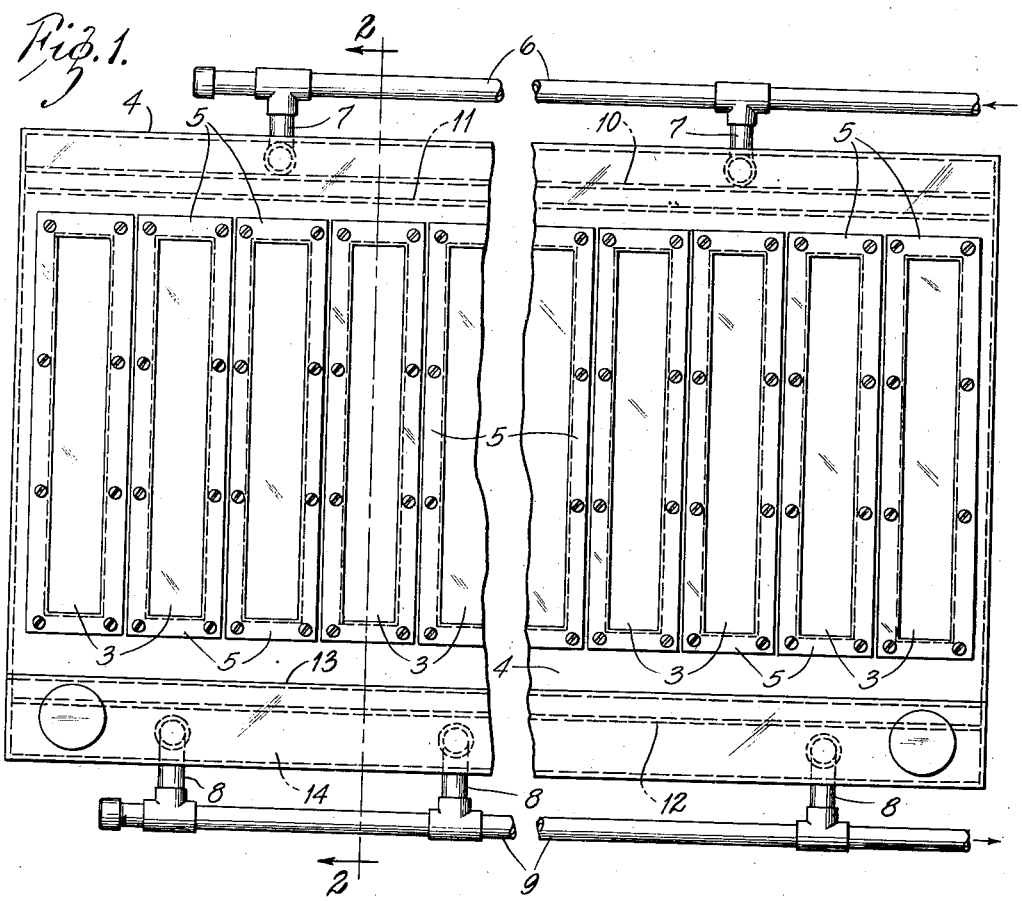
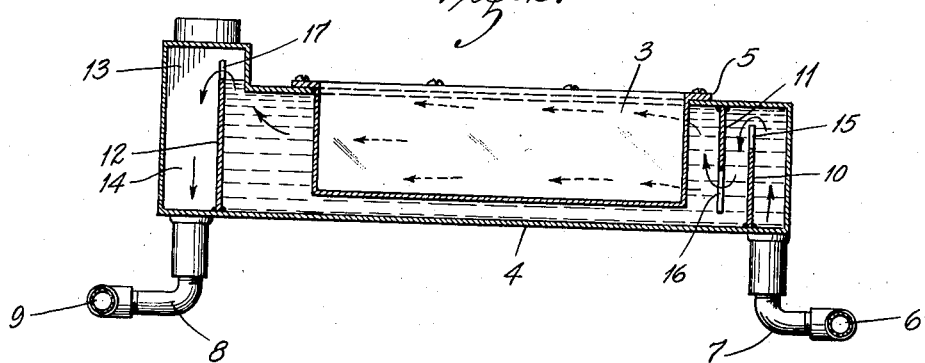
INVENTORS:
E. M. DONS,
O. G. MAURO,
By Albert J. McCauley
ATTORNEY.

Patented Aug. 5, 1941

2,251,785

UNITED STATES PATENT OFFICE 2,251,785

METHOD OF MOLDING ADHESIVE MATERIALS

Eddie M. Dens and Oswald G. Mauro, Tulsa, Okla., assignors to Mid-Continent Petroleum Corporation, Tulsa, Okla., a corporation of Delaware Application February 26, 1938, Serial No. 192,678

2 Claims. (Cl. 18—58)

This invention relates to methods of molding adhesive materials, and more particularly to the art of molding amorphous wax, asphalt, and other normally solid materials which can be poured in a molten condition into forms or molds, but which are of such a nature that when warm they firmly adhere to the molds and can not be readily removed.

Heretofore it has been difficult to mold high melting point amorphous wax in cakes or slabs because the warm wax would adhere tenaciously to the faces of the mold into which it was poured, and cakes thus formed could not be removed from the mold.

Various expedients have been used, such as coating the inner surface of the mold with a thin film of material which prevents the sticking of the material to the surface of the mold. While this has been successful, it is necessary to coat the surface of the mold with this material each time the wax is poured. This requires time and increases the cost of molding the wax. In addition to this, the material used for coating the mold adheres to the surface of the wax cake and very often the presence of this material on the wax cake is an objectionable contamination. We have developed a method of molding this amorphous wax and other materials with similar characteristics into cakes, which is entirely free from the objections mentioned and which has other important advantages.

In one form of the invention, the mold for casting this material is cooled to a temperature lower than about 40° F., preferably between about 32° F. and 30° F., and the hot molten material is poured into the cold mold. The cakes thus formed show no tendency to adhere to the mold. It appears that the film of wax or other material next to the metallic faces of the mold is so suddenly chilled to a hard surface that it does not have an opportunity to penetrate the pores of the metal. It also appears that at such low temperatures a film of moisture condenses on the surface of the metal, and that this film prevents the wax from entering the surface pores of the metal momentarily until the wax has had time to solidify past the sticky stage. Having the molds at this low temperature hastens the cooling process and shortens the time cycle, so that more cakes can be produced per mold per day than when the mold is at a higher temperature.

In carrying out this method, the mold or form may be jacketed and brine or other cooling medium may be circulated through the jacket surrounding the mold so as to cool the mold to the desired low temperature. Slabs or cakes of wax may thus be formed and cooled rapidly, and we have found that cakes so molded can be very easily dumped or lifted out of the mold with no tendency whatever of the material to stick to the metal.

As a specific illustration of the invention, we will refer to the molding of amorphous wax having a melting point above 150° F., for example, about 170° F. This wax is normally solid and non-adhesive, but when warm it is quite sticky. We heated it to a temperature above its melting point, and chilled the mold to a temperature low enough to condense from the atmosphere and form on the molding surfaces a chilled film of frosty moisture. The hot molten amorphous wax was discharged onto this cold film.

As a result, the molded surfaces of the wax were suddenly cooled to a temperature at which they were non-adhesive, and this was followed by contraction of the wax cake which automatically separated it from the side walls of the mold. The natural tendency of the amorphous wax to adhere to the mold was eliminated, and in demonstrating the method for commercial practice we have found that the molded faces of the wax cakes are quite smooth and uniform, and, of course, entirely free of the objectionable coating heretofore employed to prevent adhesion of the wax to the mold.

With the foregoing and other objects in view, the invention comprises the novel method hereinafter more specifically described and shown in the accompanying drawing, which illustrates one form of the invention. However, it is to be understood that the invention comprehends changes, variations and modifications within the scope of the claims hereunto appended.

In the accompanying drawing, which illustrates a commercial apparatus designed for one form of the invention—

Fig. 1 is a top view of a row of molds surrounded by a refrigerating chamber, the middle portion of the apparatus being broken away.

Fig. 2 is a transverse section taken approximately on the line 2—2 in Fig. 1.

This apparatus comprises a row of molds 3 surrounded by an elongated refrigerating chamber 4. Each mold 3 is provided with a flange 5 at the top seated upon the refrigerating chamber. It will be observed that the molds are separated from each other and also from the side and bottom walls of the chamber, so as to provide open passageways for the circulation of cold brine, or other refrigerant, around the suspended molds.

The brine may be admitted from a supply pipe 6 having branches 7 connected to the bottom of the refrigerating chamber at points near one side of the apparatus. The relatively warm brine is discharged at the opposite side, through pipes 8 leading from the bottom of the refrigerating system to a return pipe 9.

To efficiently distribute the brine around the series of molds, the refrigerating chamber may be provided with weirs 10, 11 and 12 arranged longitudinally of said chamber. The weir 10 extends upwardly from the bottom of the refrigerating chamber, while the weir 11 extends downwardly from the top of said chamber, and it will be observed that the weir 11 lies between the weir 10 and the row of molds.

At the opposite side of the apparatus, the refrigerating chamber extends upwardly to form an overflow compartment 13 in a plane higher than the tops of the molds. The weir 12 extends upwardly from the bottom of said chamber and terminates in the overflow compartment 13, a discharge well 14 being formed between said weir 12 and the adjacent side wall of the refrigerating compartment.

The cold incoming brine enters the elongated space between the weir 10 and a side wall of the chamber, and flows upwardly and around the notched upper edge 15 of the weir 10 near the top of the refrigerating chamber. The brine then flows downwardly between the weirs 10 and 11, and around the notched lower edge 16 of the weir 11. After passing around the elongated row of molds 3, the relatively warm brine enters the overflow compartment 13 and is discharged over the notched upper edge 17 of the weir 12, to the discharge well 14 from which it is removed through the pipes 8. The brine is thus distributed to the series of molds in the elongated refrigerating chamber, and since the level of the overflow at the top of the weir 12 is higher than the tops of the molds, it will be observed that the molds are almost entirely submerged in the circulating brine.

However, each mold is open at the top to receive the molten material, so this hot material can be readily introduced into the chilled molds, and the resultant loose cakes can be easily and quickly removed from the molds. The row of molds may be so long that the operations can be carried out continuously. The time required to pour the molten material into the series of molds may be approximately equal to the total time required for molding and cooling a cake in one mold, and again chilling the surface of the mold to the desired charging temperature. This substantially continuous operation is quite economical, as it results in a high capacity and avoids undue loss that would be incurred by prolonged cooling of the empty molds.

We claim:

1. In the art of molding material that is adhesive when warm, the method of preventing adhesion of said material to the mold which comprises, heating said material to a temperature above its melting point, chilling the mold to a temperature low enough to precipitate from the atmosphere and form on the molding faces a frosty film of condensate, and thereafter discharging the hot molten material onto said frosty film.

2. In the art of molding amorphous wax that is adhesive when warm, the method of preventing adhesion of the amorphous wax to the mold which comprises, heating the wax to a temperature above its melting point, chilling the mold to a temperature approximating 32° F., and thereafter introducing the hot molten amorphous wax into the chilled mold.

EDDIE M. DONS.
OSWALD G. MAURO.